United States Patent [19]

Zindler

[11] 4,290,512

[45] Sep. 22, 1981

[54] CLUTCH AND BRAKE MECHANISM

[76] Inventor: Hugh A. Zindler, Rte. 3, Box 264, Pleasant Valley La., Watertown, Wis. 53094

[21] Appl. No.: 73,064

[22] Filed: Sep. 6, 1979

Related U.S. Application Data

[62] Division of Ser. No. 809,207, Jun. 23, 1977, Pat. No. 4,226,312.

[51] Int. Cl.³ .................. B60K 41/20; B60K 41/24
[52] U.S. Cl. ............................. 192/1; 192/17 R; 56/11.3
[58] Field of Search ............. 192/17 R, 14, 1, 3 S, 192/3 M, 0.082, 0.094, 144; 56/11.3, 10.2; 192/105 BA; 30/381

[56] References Cited

U.S. PATENT DOCUMENTS

| | | | |
|---|---|---|---|
| 2,486,815 | 11/1949 | Banker | 192/17 R X |
| 3,101,822 | 8/1963 | Clemens | 192/1 |
| 3,228,177 | 1/1966 | Coates | 192/1 X |
| 3,461,994 | 8/1969 | Dallman et al. | 192/105 BA |
| 4,035,994 | 7/1977 | Hoff | 192/3 M X |
| 4,044,533 | 8/1977 | Wick | 56/11.3 |
| 4,088,210 | 5/1978 | Hoff | 192/105 BA X |
| 4,205,509 | 6/1980 | Miyazawa et al. | 192/14 X |
| 4,213,521 | 7/1980 | Modersohn | 56/11.3 X |

FOREIGN PATENT DOCUMENTS

| | | | |
|---|---|---|---|
| 1045804 | 12/1958 | Fed. Rep. of Germany | 192/17 R |
| 1173043 | 2/1959 | France | 192/17 R |
| 608281 | 12/1978 | Switzerland | 192/3 M |

*Primary Examiner*—George H. Krizmanich
*Attorney, Agent, or Firm*—Andrus, Sceales, Starke & Sawall

[57] ABSTRACT

The disclosure provides for a number of improvements in a brake-clutch mechanism wherein a drum is carried on the drive member for driving engagement by clutch shoes carried by the driven member. The clutch shoes are normally biased into driving engagement with the drum and a brake band is utilized to move the clutch shoes out of engagement with the drum and to stop rotation of the driven member without interrupting the rotation of the drive member. The improvements relate to a higher torque capability for the mechanism, the exclusion of foreign matter from the mechanism, the mounting for the brake band, the use of the brake band to aid in keeping the braking surfaces clean, and provision for cut-off of the power source in the event the brake band should fail. The disclosure further contemplates a novel arrangement for driving and controlling the chain sprocket of a chain saw.

5 Claims, 13 Drawing Figures

CLUTCH AND BRAKE MECHANISM

This application is a division of copending application Ser. No. 809,207, filed June 23, 1977 and now issued to U.S. Pat. No. 4,226,312.

BACKGROUND AND SUMMARY OF THE INVENTION

This invention relates to certain improvements in a clutch and brake mechanism particularly adapted for but not limited to smaller horsepower application.

The applicant is a joint inventor on an application filed Feb. 2, 1976, Ser. No. 654,214 for a clutch and brake mechanism. That earlier application relates to and describes a low torque clutch. At least in the case of lawn mowers, the low torque clutch has not proven to advantage. In heavy grass, a low torque clutch can be subjected to considerable slippage between drive and driven members, giving rise to the generation of considerable heat, and even possible fire hazzard when operating in dry grass. Further, the heat will serve to anneal the clutch springs and result in an even lower clutch capacity. Shorter clutch life is also to be expected.

Thus, for lawn mowers and other applications, a high torque, or at least a higher torque clutch is preferred to minimize clutch slippage and consequent heat build-up in the clutch mechanism. With a higher torque capability, the engine will be lugged down and killed if it is overloaded and yet is protected when an obstruction is encountered. It is generally an object of this invention to provide a clutch and brake mechanism of higher torque capability.

For good clutch and brake operation, it is important that the clutch and brake surfaces remain clean and dry. Clippings, sawdust, dirt, oil and other foreign matter are deleterious to proper clutch and brake engagement. It is also an object of this invention to substantially preclude the entry of foreign matter into the clutch-brake housing and thus possibly interfere with the clutch and braking operations.

The invention contemplates the use of a brake band for declutching and stopping rotation of the driven member without interrupting the rotation of the drive member. Further aspects of the invention relate to the mounting of the brake band, utilization of the brake band to aid in keeping the braking surface clean, and provision for the cut-off of the power source in the event the brake band should fail.

DESCRIPTION OF THE DRAWING FIGURES

The drawings furnished herewith illustrate the best mode presently contemplated for carrying out the invention and are described hereinafter.

In the drawings.

DESCRIPTION OF THE ILLUSTRATED EMBODIMENTS

Figure 1:
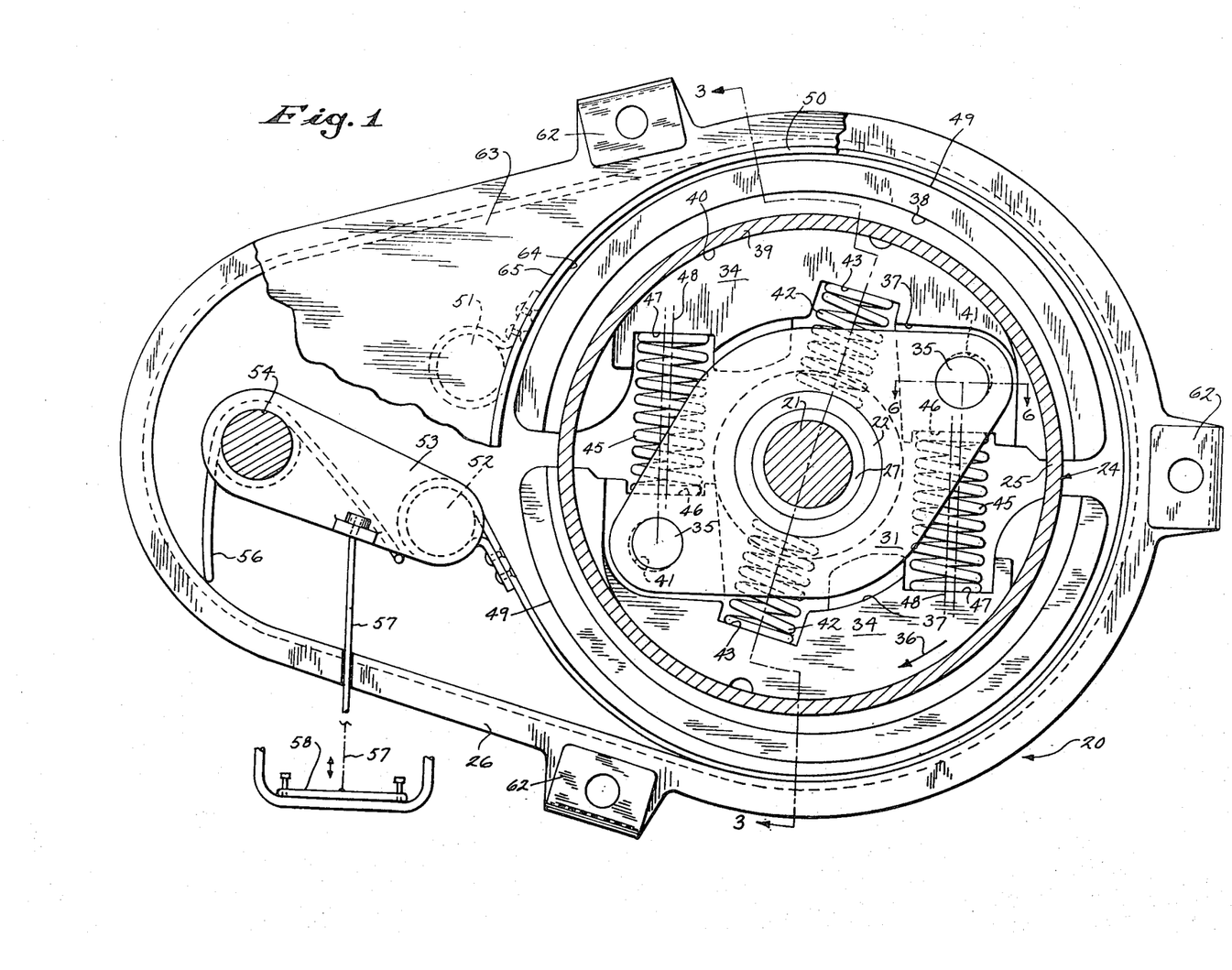
FIG. 1 is a plan view of the clutch-brake mechanism of this invention and is generally taken on line 1—1 of FIG. 3.

Referring to the drawings, the clutch-brake mechanism 20 of this invention is interposed between the drive shaft 21 of an engine or other power source, not shown, and a driven shaft 22. The mechanism 20 shown in FIG. 1 is specifically intended for use on a lawn mower, but is readily adapted for use between the drive and driven members in many other applications.

Figure 3:
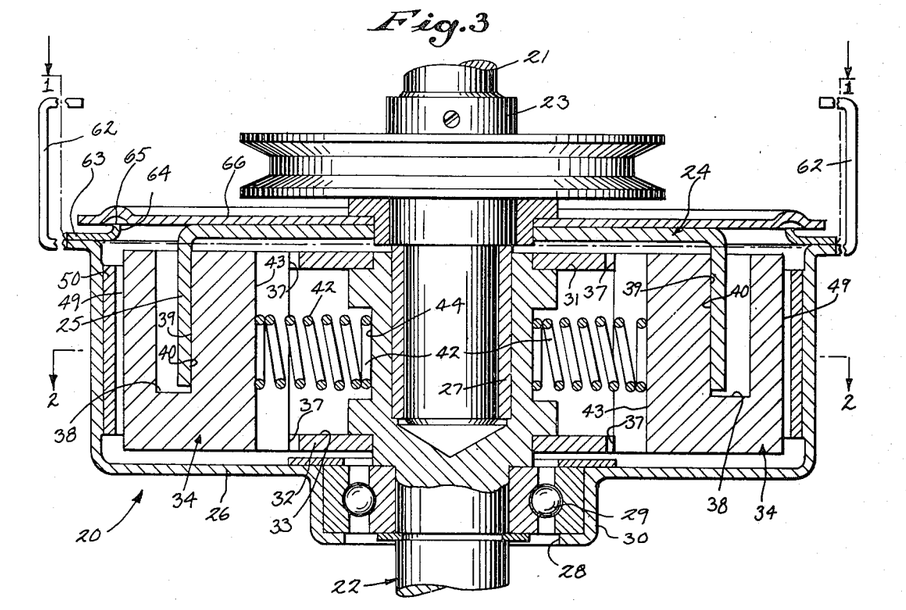
FIG. 3 is a sectional elevation taken generally on line 3—3 of FIG. 1.

The drive shaft 21 carries a hub 23 that mounts a drum 24 having a circumferential flange 25 that projects axially into the housing 26. Beyond the hub 23, the end portion of the shaft 21 extends into and is piloted within the bearing sleeve 27, as generally shown in FIG. 3.

The driven shaft 22 is aligned with the shaft 21 and piloted on the exterior of the bearing sleeve 27. The shaft 22 projects from the housing 26 through the opening 28 and is rotationally supported by the ball bearing 29 seated adjacent the opening 28 in the annular housing projection 30. Within the housing 26, the shaft 22 carries a pair of axially spaced, generally parallel plates 31 and 32. Plates 31 and 32 are generally oval-shaped and are aligned axially and form a peripheral recess 33 on the shaft 22 which is radially aligned with the circumferential flange 25 of the drive shaft drum 24.

The driven shaft 22 carries a pair of diametrically opposed clutch shoes 34 for engagement with the drum 24. The shoes 34 are disposed symmetrically with respect to the axis of shaft 22 and a portion thereof is slidably disposed in the peripheral recess 33 between the plates 31 and 32. The respective shoes 34 are pivoted on corresponding pins 35 supported between the radially extended portions of the plates 31 and 32. In relation to the forward direction of travel of the shoes 34 as indicated by the direction arrow 36 in FIG. 1, the shoes are pivoted adjacent to their leading end.

Corresponding portions of each shoe 34 are stepped axially outwardly beyond the radial confines of plates 31 and 32 to provide the shoes with axially spaced shoulders 37 which are engageable with the corresponding edges of the plates to establish the limiting clutch disengaged position of the shoes. The side of the shoes 34 facing the drum 24 are provided with an arcuate recess 38 for receiving the projecting drum flange 25. When the shoes 34 are pivoted to their outermost position, the inner face 39 of the recesses 38 are disposed in a circular configuration to generally match and drivingly engage the inner face 40 of the flange 25. When so engaged by the clutch shoes 34, the powered drive shaft effects rotation of the driven shaft 22.

The shoes 34 are each provided with an oversize hole 41 at the pivot mounting to provide a substantial clearance on the pins 35. When the pins 35 are ¼ inch in diameter, the hole 41 should be about 9/32 inch providing a clearance of about 1/32 inch as perhaps more clearly shown in FIG. 6 for reasons hereinafter explained.

Shoes 34 are normally biased outwardly toward engagement with the drum flange 25 on the drive shaft 21. The capacity of the clutch is at least in part determined by the spring-load imposed on the shoes 34 and is generally tailored in accordance with the application of the clutch-brake mechanism 20. The application for the mechanism 20 generally depicted in FIGS. 1–5 relates to a walk-behind lawn mower and includes the compression springs 42 disposed between the drive shaft 22 and the respective shoes 34. The springs 42 exert their biasing force generally radially with respect to the shaft 22 and toward the leading end of the shoes 34 on a line about 45° removed from the radial lines through the axis of the respective pivot pins 35. The respective springs 42 extend between the recessed seat 43 on the shoes 34 and the peripheral recess 44 on the driven shaft 22 between the plates 31 and 32.

For some applications the springs 42 alone will provide adequate torque capacity for the clutch. For other applications compression springs 45 alone may be utilized. For applications requiring a still greater torque capacity, a combination of springs 42 and 45 may be utilized as generally shown in FIG. 1. The respective springs 45 are disposed between the opposed seats 46 and 47 provided at the leading end of one shoe 34 and the trailing end of the opposed shoe, respectively. Springs 45 are so disposed to place their line of force generally parallel to and spaced inwardly from a line through the axis of the pivot pins 35 and extending normal to the opposed spring seats 46 and 47 when the shoes 34 are in the clutch engaged position as generally shown in FIG. 1 by the dot-dash line 48. With the line of force of springs 45 disposed inwardly relative to the axis of pivot pins 35 and with the springs 42 exerting a force toward the leading ends of the shoes 34, the springs tend to move the leading end of the shoes 34 outwardly on a radial line through the axis of the pivot pins 35 as provided for by the shoe clearance on the pivot pins.

Figure 2:
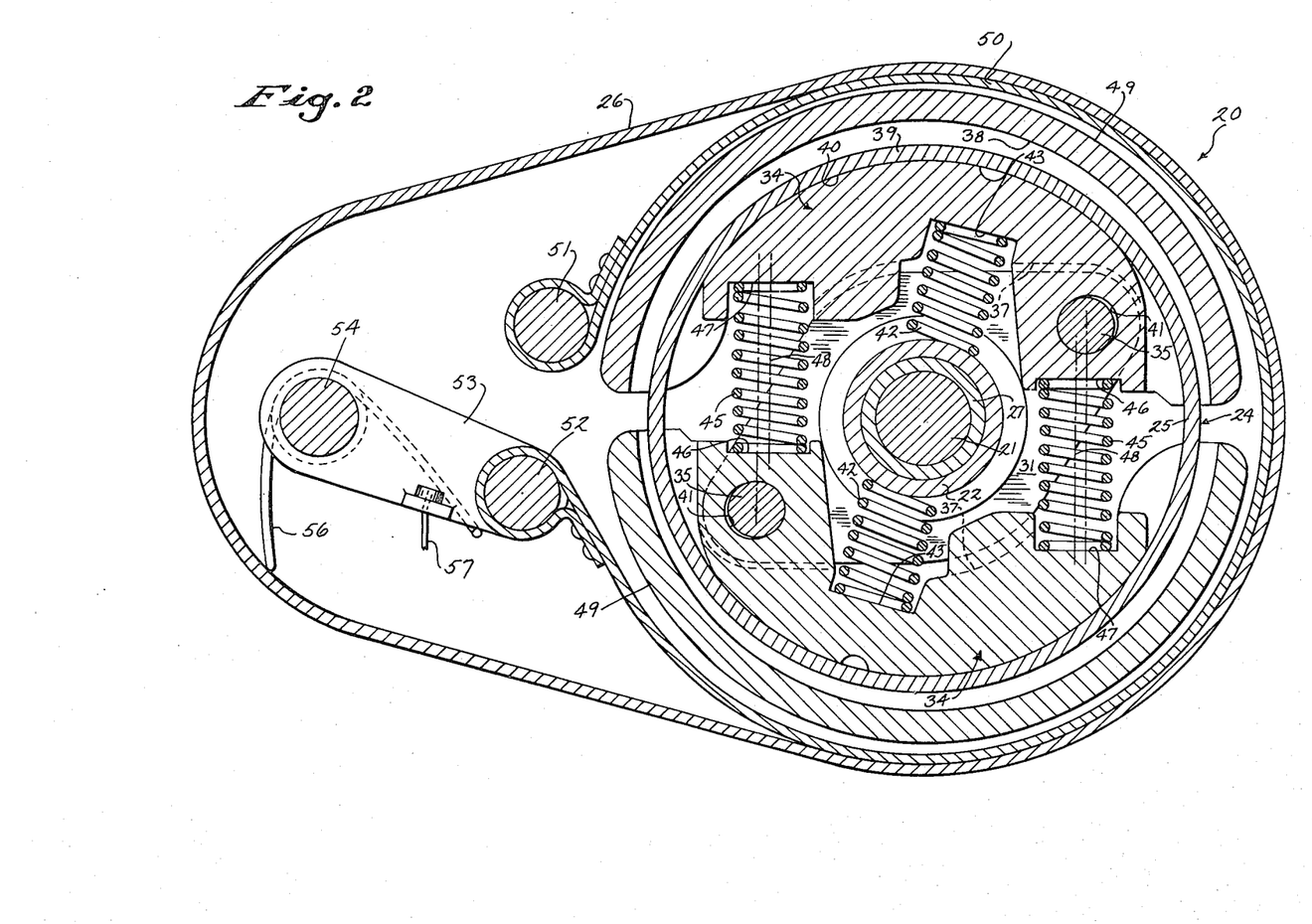
FIG. 2 is a sectional view taken generally on line 2—2 of FIG. 3 and shows the clutch in the fully engaged position.
Figure 5:
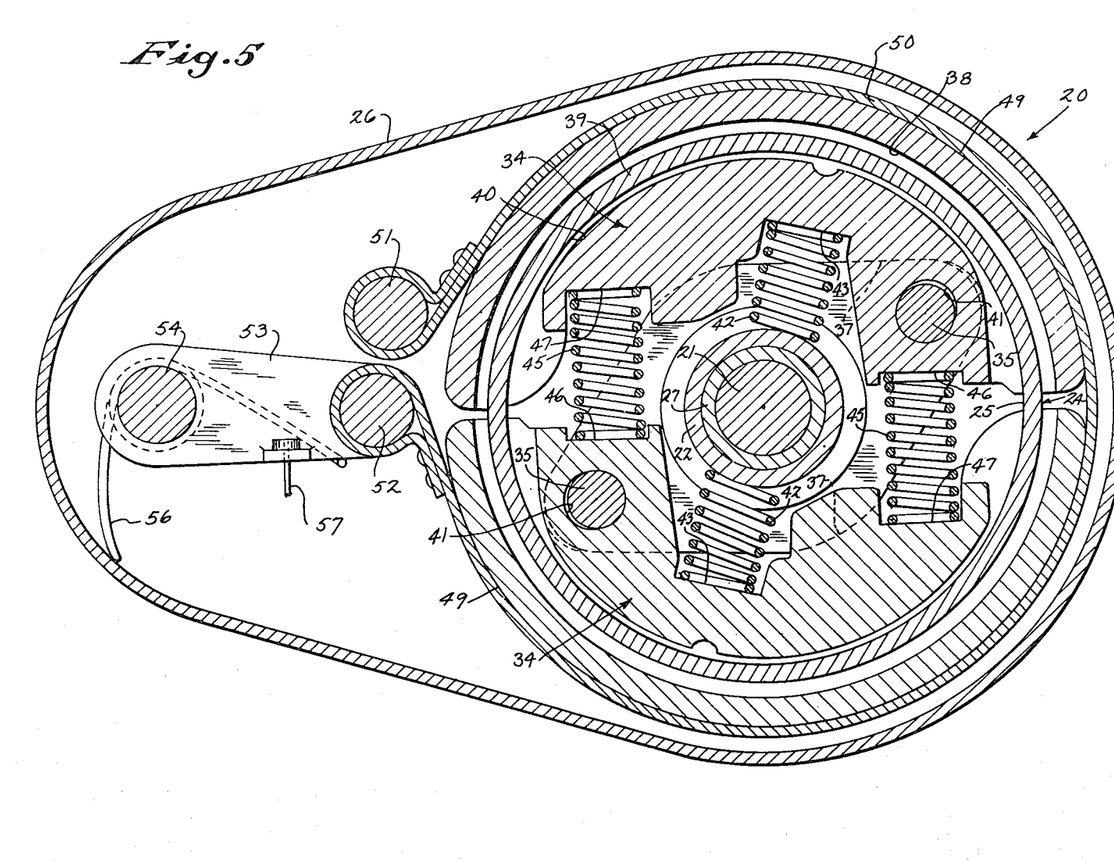
FIG. 5 is a sectional view similar to that of FIG. 2 showing the clutch disengaged and the brake fully engaged.

Radially outward from the recess 38, the shoes 34 are provided with an arcuate braking surface 49 engageable by the brake band 50. The brake band 50 extends around the outside periphery of the shoes 34 and has one end thereof secured to a fixed anchor pin 51 and the opposite end secured to the movable anchor pin 52. The movable anchor pin 52 is carried by the lever 53 pivoted on the pin 54. The lever 53 is movable between positions corresponding to the extended or brake-off condition of the brake band 50 as generally shown in FIGS. 1 and 2 and the fully contracted or brake-on condition for the band as generally shown in FIG. 5.

With the lever 53 in the extended or brake-off condition of the brake band 50, the band lies adjacent to the wall of housing 26 and clear of the clutch shoes 34 in their clutch engaged position. When the lever 53 is moved to the fully contracted or brake-on condition, as shown in FIG. 5, the band 50 engaged with the outer surface 49 of the shoes 34 and pivots the shoes inwardly against the biasing force of the springs 42 and 45 to effect a disengagement of the shoes from the drum flange 25 to declutch the driven shaft 22 from the drive shaft 21 and to stop rotation of the driven shaft without interruption of the rotation of the drive shaft and its power source. In the braking sequence from the forward direction of travel for the shoes 34 as indicated by the direction arrow 36, the contracting brake band 50 is initially brought into contact with the shoes and then frictionally tightens itself thereon so as to be self-energizing and thus effect a quick clutch release, and a quick stop of the driven shaft 22. When braking, the inward pivotal movement of the shoes 34 is interrupted when the shoulders 37 on the shoes engage with the peripheral edges of plates 31 and 32 as generally shown in FIG. 5. In the innermost braking position, the outer surfaces 49 of the shoes 34 are generally disposed in a circular configuration or are symmetrical relative to the axes of shafts 21 and 22.

Figure 4:
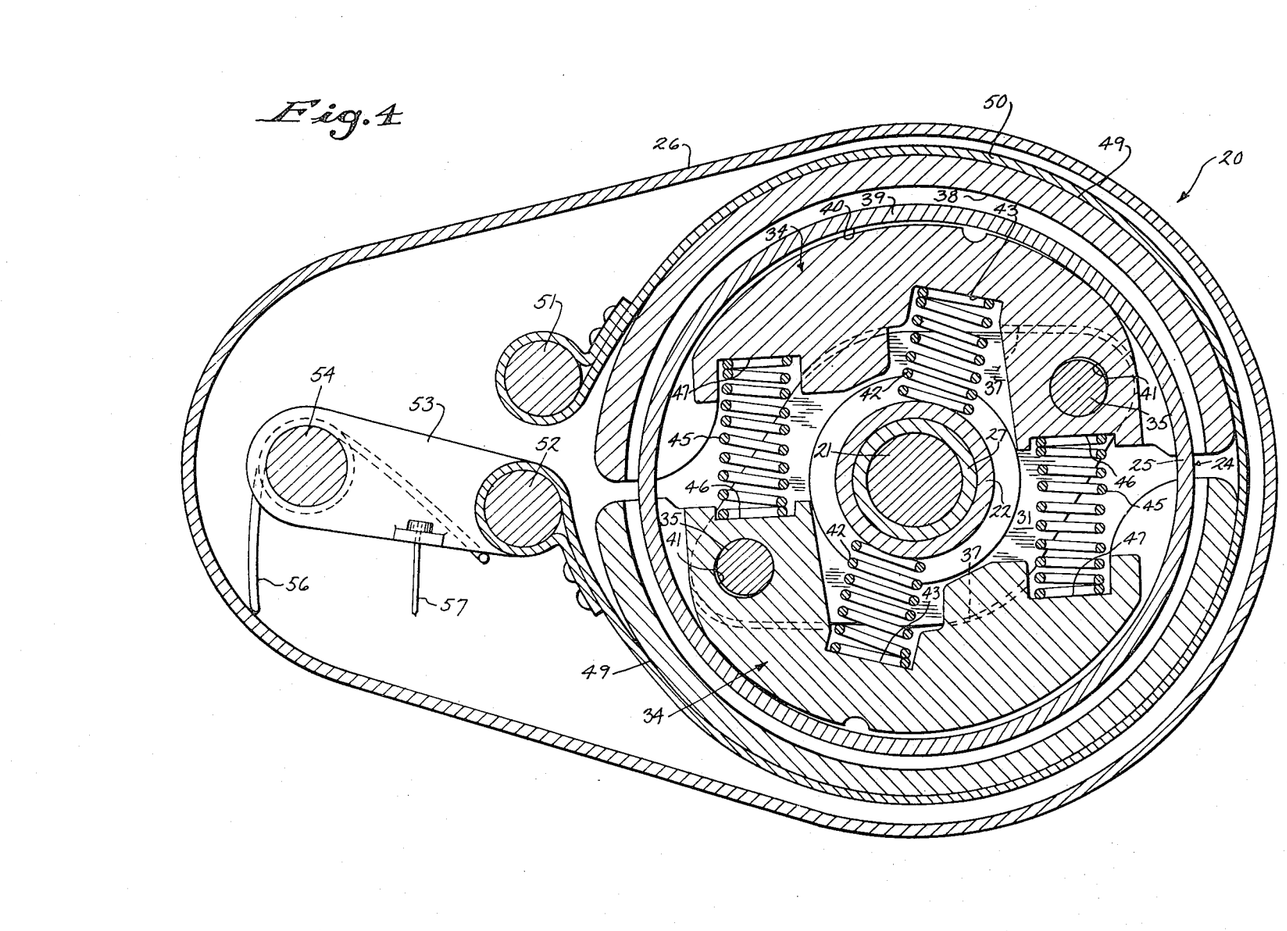
FIG. 4 is a sectional view similar to that of FIG. 2 and shows the clutch at the start of its engagement with the drive member.
Figures 6, 7, 8:
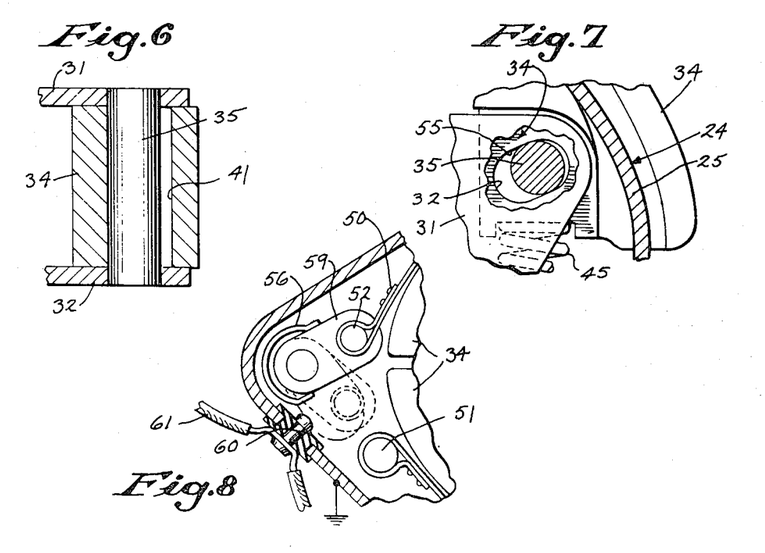
FIG. 6 is a detail section taken generally on line 6—6 of FIG. 1.
FIG. 7 is a detail section showing a further embodiment of the invention.
FIG. 8 is a detail view illustrating the provision for cut-off of the power source in the event of a brake band failure.

When the lever 53 is moved to restore clutch engagement in the forward direction of travel for the clutch shoes 34, the clutch faces 39 adjacent to the leading ends of the shoes make the initial contact with the inner face 40 of the drum flange 25 as the clearance formed by the oversize hole 41 of the shoes on the pivot pins 35 is restored outwardly by the springs 42 and 45 as generally shown in FIG. 4. The friction resulting from the initial contact at the leading end of the shoes 34 with the rotating drum flange 25, causes the shoes to cam and grab the drum 24 to quickly restore full engagement and power to the driven shaft 22. If desired, the oversized hole 41 in the shoes 34 may be replaced by a slot 55 extending at about 30° from the symmetrical centerline through the clutch as generally shown in FIG. 7.

The brake-clutch mechanism 20 can also be used in applications requiring a reversible power source. When the drive shaft 21 is rotating in a direction opposite from direction arrow 36, however, the brake band 50 will not be self-energizing but nevertheless will be effective to provide for clutch release and stopping of the driven shaft 22 without interruption of the drive shaft 21 and its power source. Clutch engagement in reverse will also be effective but will involve more slippage or chatter between the shoes 34 and the drum flange 25 and requires more time since initial camming of the shoes cannot be expected.

The lever 53 for extending and contracting the brake band 50 is normally biased to the braking position by the torsion spring 56. The lever 53 can be connected by a control cable 57 or the like to a deadman's handle 58 which when engaged by the operator pulls the lever to the braking position shown in FIG. 1 against the bias of spring 56. When the deadman's handle is released, the torsion spring 56 moves the handle to the brake-on position and effects a contraction of the brake band 50 to disengage the clutch and stop the driven shaft 22 without interruption in the rotation of the drive shaft 21.

In the instance where the brake band 50 should fail by reason of its severance at some cross-section along its length, the clutch might unwittingly become engaged to drive the driven shaft 22 when not expected, giving rise to a possible dangerous circumstance. To avoid such a problem, the lever 59 can be designed so that it can rotate in avoidance of the fixed anchor pin 51 as generally shown in FIG. 8. In case of severance of the brake band 50, the lever 59 will be rotated under the influence of the torsion spring 56, as generally shown by the dashed lines in FIG. 8, past the normal brake-on position, to engage with a grounding pin 60 connected into the ignition circuitry 61 of an engine, not shown, to short out the ignition circuit and so stop the engine to preclude possible injury by reason of the unwitting engagement of the driven shaft 22. In the case of an electric motor drive, a micro-switch could be provided in place of the grounding pin 60 to short out a make-and-brake circuit for the motor.

A low torque clutch is generally not favored when applied to a lawn mower. When a low-torque clutch is overloaded, as when cutting heavy grass for example, there will be considerable clutch slippage which will generate a considerable heat in the clutch elements and its housing. Such heat will have an annealing effect on the one or more clutch springs to make then even less effective. Such heat may also weaken and/or shorten the life of the brake band. A high or higher torque clutch, however, as herein described seems generally favored and will offer slippage only when an obstruction is encountered to generally protect the drive parts and power source. In the case of overloading a high or higher torque clutch, as when cutting heavy grass, for example, the engine will generally be lugged down and might ultimately die with a minimum of slippage and heat generation.

For the proper functioning of the brake-clutch mechanism 20, it is essential that the brake and clutch surfaces remain relatively clean and dry. Moisture, oil, dirt, clippings, saw dust and other foreign matter are likely to prove deleterious for proper functioning of the mechanism.

Referring particularly to FIG. 3, the cup-like housing 26 is suspended beneath the deck, not shown, of a lawn mower by a plurality of spaced hangers 62. A seal plate 63 is disposed on the upper open side of the housing 26 and has a circular opening 64 which generally provides an open exposure to the brake-clutch mechanism 20. The edge of the circular opening 64 is provided with an upturned lip 65 generally aligned radially with the radially extending portion of the drum 24. A generally circular slinger plate 66 is carried by the drive hub 23 and extends radially over and in close proximity to the edge of lip 65 to in effect provide a rotary closure for the opening 64. Possible oil drippings from the engine or other motive source, clippings or other dirt and foreign matter alighting on the slinger plate 66 are substantially precluded from entry into the housing 26 and cast centrifugally by the slinger plate clear of the opening 64. The slinger plate 66 and drum 24 may be fabricated and assembled integrally on the drive hub 23.

Figures 9, 10, 12, 13:
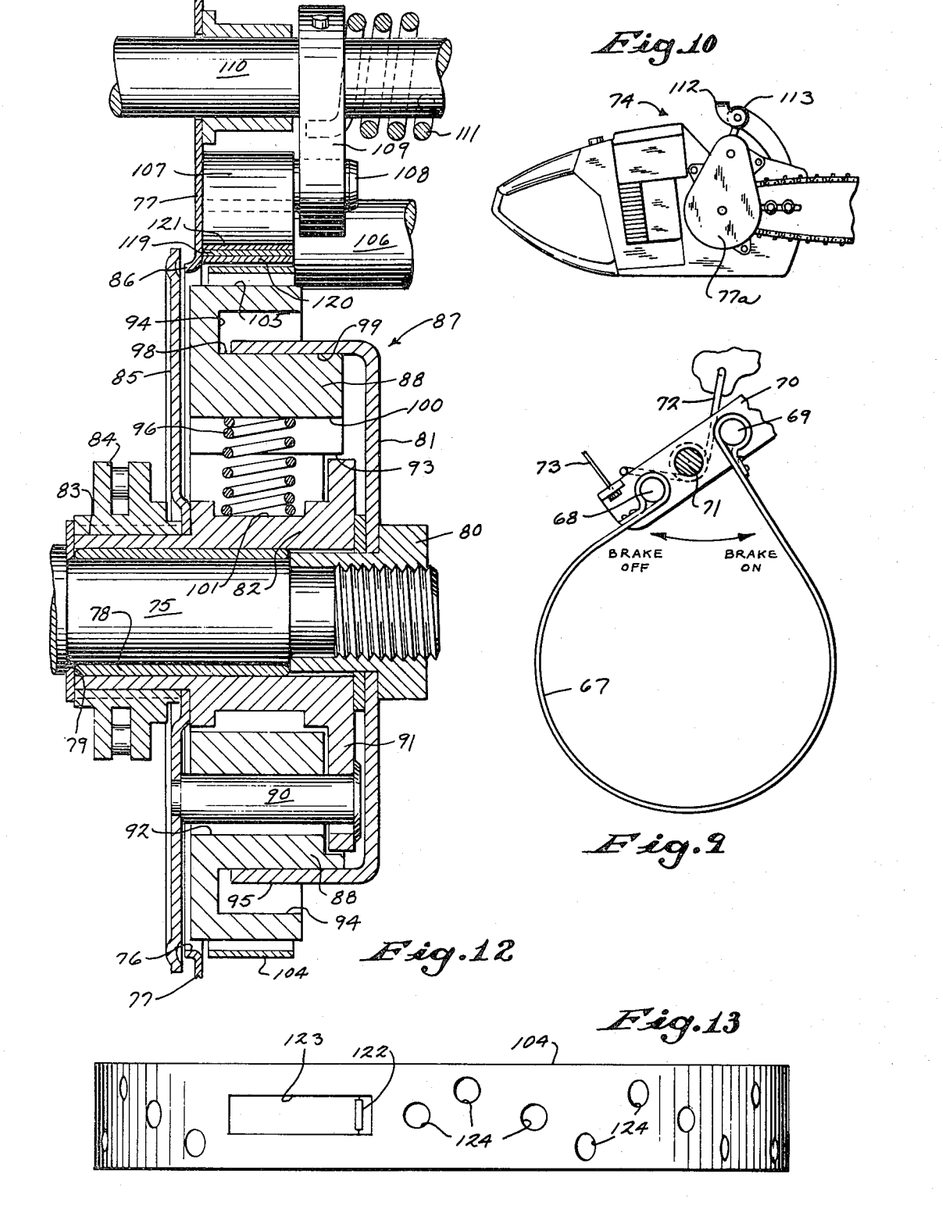
FIG. 9 is a detail view showing a further embodiment for the mounting of a brake band.
FIG. 10 is a partial side elevation of a chain saw which embodies certain aspects of the invention.
FIG. 12 is a sectional elevation taken generally on line 12—12 of FIG. 11.
FIG. 13 is an enlarged view of the brake band as employed in FIGS. 11 and 12.

In the embodiment of FIG. 9, the brake band 67 is connected to a pair of movable anchors 68 and 69 carried by the lever 70 on opposite sides of the pivot pin 71 mounting the lever. The lever 70 is normally biased by the torsion spring 72 to move the anchors 68 and 69 counterclockwise about the pivot pin 71 to contract the brake band 67 into the braking position. Movement of the lever 70 in the opposite direction against the biasing force of the spring 72, as by a deadman's handle or the like, not shown, through the control cable 73 extends the brake band 67 to the brake-off position allowing the clutch to engage to drive the driven member.

FIGS. 10-13 indicate how the clutch-brake mechanism of this invention can be applied to a chain saw 74 with several additional features being shown.

The stepped drive shaft 75 extends through the circular opening 76 of the seal plate 77 secured to the housing 77a. A bearing sleeve 78 is disposed on the shaft 75 and extends between the shoulder 79 spaced from the end of the shaft and the nut 80 threaded onto the end of the shaft. The drive shaft 75 carries a drum 81 which may be integral with the end nut 80.

A tubular driven member 82 is freely rotatable on the bearing sleeve 78 and generally extends between the shoulder 79 on the drive shaft 75 and the drum 81. The end portion of the driven member 82 adjacent to the shoulder 79 is provided with spline grooves 83 to drivingly mount the cutting chain sprocket 84. Adjacent to the sprocket 84 the driven member 82 carries a circular slinger plate 85 which extends radially outward beyond the circular lip 86 of the seal plate 77. Thus, the slinger plate 85 rotates with the driven member 83 to generally preclude entry of sawdust, oil and other deleterious matter to the brake-clutch mechanism 87 disposed between the slinger plate and the drive drum 81.

Figure 11:
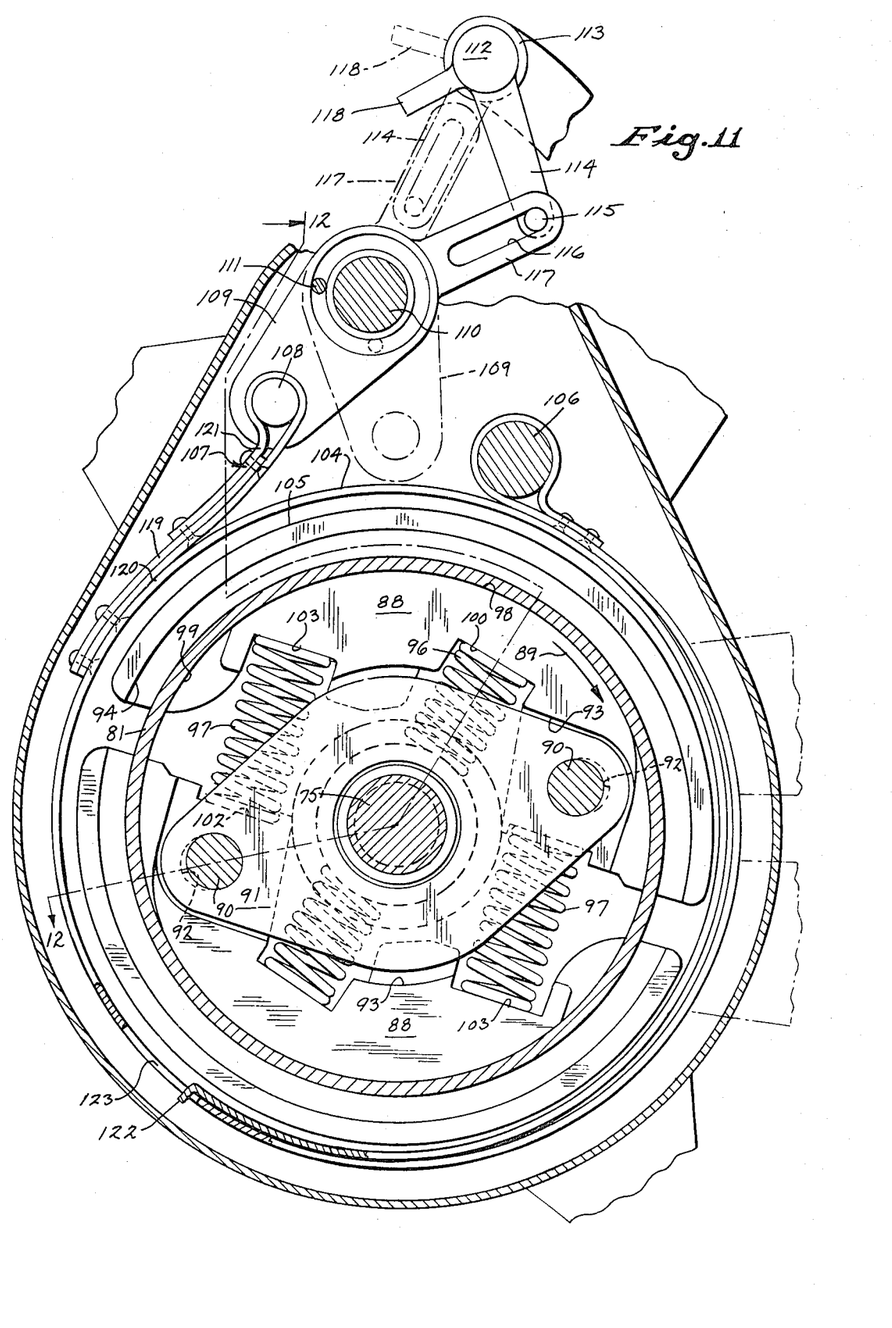
FIG. 11 is a plan view of a clutch-brake mechanism showing an embodiment wherein the brake band is partially overlapped and in the de-energized or brake-off position.

The mechanism 87 is in many respects similar to the brake-clutch mechanism 20 of FIG. 1 and includes a pair of diametrically opposed clutch shoes 88 disposed generally symmetrically with respect to the axes of the drive and driven members 75 and 82. In relation to the forward direction of travel of the shoes 88 as indicated by the direction arrow 89, the respective shoes are pivoted adjacent to their leading end on the axially extending pins 90 carried between the generally oval-shaped side plate 91 formed integrally with the driven member 82 and the slinger plate 85. The shoes 88 are provided with an oversize hole 92 at the pivot mounting to provide a substantial clearance on the pins 90 as generally shown in FIGS. 11 and 12.

The side of the shoes 88 facing the drive drum 81 are stepped axially outward beyond the radial confines of the side plate 91 to provide the shoes with a shoulder 93 engageable with the peripheral edge of the side plate to establish the limiting clutch disengaged position for the shoes. Outwardly from shoulders 93, the same side of shoes 88 are provided with an arcuate recess 94 opening toward the drum 81 for receiving the axially projecting drum flange 95.

The shoes 88 are biased outwardly into the clutch engaged position by a central spring 96 and end springs 97 to place the inner face 98 of the shoe recesses 94 in clutching engagement with the inner face 99 of the drum flange 95. The compression springs 96 extend generally radially between the recessed seat 100 on the shoes 88 and the peripheral recess 101 on the driven member 82. As in the case of springs 42 of FIG. 1, the springs 96 exert their biasing force generally radially on a line about 45° removed from the radial lines through the axis of the respective pivot pins 90. The respective compression springs 97 are disposed between opposed seats 102 and 103 provided at the leading end of one shoe 88 and the trailing end of the other shoe, respectively. As in the case of springs 45 of FIG. 1, the springs 97 are so disposed to place their line of force generally parallel to and spaced inwardly from a line through the axes of the pivot pins 90 and extending normal to the opposed seats 102 and 103 when the shoes 88 are in the clutch engaged position. When the shoes 88 are biased into their clutch engaging position, the inner faces 98 of the shoe recesses 94 define a circular configuration to complement and drivingly engage with the circular face 99 of the drum flange 95.

A brake band 104 extends around the outer periphery of the shoes 88 and is engageable with the external surfaces 105 of the shoes. One end of the brake band 104 is connected to a fixed anchor pin 106 from which the band extends completely around the shoes 88 and overlaps with a portion of itself. A loop 107 is secured to an intermediate portion of the brake band 104 for connection to a movable anchor pin 108 carried by the lever 109 which is pivotally mounted on the pin 110. In the brake-off position of the lever 109 as generally shown in FIG. 11, the brake band 104 is extended and out of contact with the shoe surface 105 to thus allow the shoes 88 to assume their clutch engaged position under the biasing force of the springs 96 and 97. The lever 109 is normally biased by the torsion spring 111 to the brake-on position, generally shown by dot-dash lines in FIG. 11, in which position the brake band 104 is contracted into engagement with the shoe surfaces 105 forcing the shoes 88 to pivot inwardly out of clutching engagement with the drum flange 95 and to stop the rotation of the driven member 82 without interruption of the rotation of the drive shaft 75 and its power source. When the brake band 104 contracts for braking from the direction of travel indicated by the direction arrow 89, it is initially brought into contact with the shoe surfaces 105 and then frictionally tightens itself thereon so as to be self-energizing and thus effect a rapid release of the clutch and a rapid stop of the driven member 82. The outer surfaces 105 of the shoes 88 assume a generally circular or concentric configuration when the shoes are pivoted to their limiting clutch disengaged position wherein the shoulders 93 engage upon the peripheral edge of side plate 91.

In the case of a chain saw 74, the lever 109 is controlled by a deadman's handle in the form of a bell crank or thumb lever 112 which is pivotally mounted on a generally horizontal axis on the horizontal carrying handle 113 of the saw. The projection 114 of lever 112 carries a pin 115 which is engageable within the slot 116 of the lever projection 117 of lever 109. Under the influence of the torsion spring 111, the levers 109 and 112 normally assume the brake-on position generally shown in dot-dash lines in FIG. 11. When the thumb projection 118 of lever 112 is depressed, the levers 109 and 112 assume the brake-off position to place the brake band 104 in its extended condition providing for clutch engagement to power the driven member 82 and chain sprocket 84.

The loop 107 secured to an intermediate portion of the brake band 104 for attachment to the movable anchor pin 108 is formed with a stiffening member 119. The member 119 is superposed onto the lower reach 120 of the loop material and extends under the upper reach 121 of the loop material to a position adjacent to the anchor pin attachment. The stiffening member 119 is made of a heavier gauge spring metal and has a slight normal S-shape configuration (reverse S-shape as viewed in FIG. 11) which is imparted to the loop 107 when the brake band 104 is in the brake-off, clutch engaged position as generally shown in FIG. 11. When the lever moves to the brake-on, clutch disengaged position under the influence of torsion spring 111 and the self-energizing character of the brake band 104, the S-shape configuration of the loop 107 is distorted with a snap action to a generally arcuate configuration. When the brake band 104 is again extended by pressure on the thumb lever 112 to re-engage the clutch, the loop 107 snaps back to its normal S-shape configuration to thereby reduce the thumb pressure requirement and help prevent the possibility of the brake band assuming a position of less than full extension where the band might interfere with complete clutch engagement.

In FIG. 11, the brake band 104 is shown to be overlapped inwardly approximately 210° with the end thereof having a projection 122 turned outwardly for engagement within a recess 123 provided in the outer layer of the band. The recess 123 is sufficiently long to accommodate relative movement of the projection 122 as the brake band 104 is extended and contracted. Overlap in the brake band 104 appears to materially reduce the braking time. The amount or length of overlap in the brake band 104 will likely have to be determined empirically and may vary considerably in accordance with the application for the brake-clutch mechanism.

According to FIG. 13, the brake band 104 is provided with a plurality of spaced holes 124. The holes 124 aid in wiping oil, chips and other deleterious matter from the outer surface 105 of the shoes 88 to thus aid in maintaining the surfaces generally dry and clean.

As applied to a chain saw 74, the clutch-brake mechanism 87 generally avoids the hazzard of chain motion or creep at idle speed common in conventional chain saws when the engine is adjusted to a higher idle speed to improve starting and prevent the engine from dying out. In the operation of chain saw 74, braking can be applied at any speed when a dangerous situation develops. No throttling down of the engine is required, nor a chain coasting to a stop as in conventional chain saws. Thus, the clutch-brake mechanism 87 renders the chain saw 74 a far safer implement.

While the several improvements comprising the invention have been variously and specifically applied to lawn mowers and chain saws, they likely will find further application in presses, rototillers, snowblowers and numerous other implements.

Various modes of carrying out the invention are contemplated as being within the scope of the following claims particularly pointing out and distinctly claiming the subject matter which is regarded as the invention.

I claim:

1. In a power driven implement, rotatable drive and driven members, a power source for the drive member, a drum carried on the drive member, clutch shoes carried on said driven member and being movable relative thereto into and out of clutching engagement with the drum, means biasing the shoes into engagement with the drum to drivingly clutch the drive and driven members together, a brake band for effecting movement of said shoes out of engagement with the drum against the force of said biasing means and to stop rotation of the driven member without interrupting the rotation of the drive member, spaced portions of said brake band being connected to a fixed anchor pin and a movable anchor pin respectively, a pivotally mounted lever carrying said movable anchor pin and being normally movable between angularly spaced brake-on and brake-off positions for the brake band, spring means biasing said lever to the brake-on position for the brake band, means engageable by the lever to interrupt the power source, said power source interrupting means being angularly spaced from the brake-on position of the lever in a direction opposite from the brake-off position of the lever, said spring means biasing the lever through the brake-on position of the lever and into the power source interrupting means in the event of brake band failure.

2. The structure as set forth in claim 1 wherein the power source is an engine having an ignition circuit, and the means engageable by the lever to interrupt the power source is a grounding pin connected into the ignition circuit to short out the ignition circuit and thus stop the engine.

3. In a power driven implement, rotatable drive and driven members, a power source for the drive member, clutch means interposed between the drive and driven members and being normally engaged to drivingly clutch the drive and driven members together, a brake band engageable with the clutch means to declutch the drive and driven members and stop the driven member without interrupting operation of the drive member and its power source, actuating means for the brake band movable between brake-on and brake-off positions for the brake band, spring means biasing the actuating means to the brake-on position for the brake band, and means engageable by the actuating means to interrupt the power source, said power source interrupting means being spaced from the brake-on position of the actuating means in a direction opposite from the brake-off position of the actuating means, said spring means biasing the actuating means through the brake-on position of the actuating means and into the power source interrupting means in the event of brake band failure.

4. The structure as set forth in claim 3 wherein the power source is an engine having an ignition circuit, and the means engageable by the actuating means to interrupt the power source in the event of a brake band failure is a grounding pin connected into the ignition circuit to short out the ignition circuit and thus stop the engine.

5. The structure as set forth in claim 3 wherein the actuating means for the brake band includes a pivotally mounted lever movable between the brake-off position for the brake band and the power source interrupting means.

* * * * *